(12) United States Patent
Jain (10) Patent No.: US 7,728,568 B1
(45) Date of Patent: Jun. 1, 2010

(54) POWER SUPPLY CIRCUIT AND SWITCH DRIVERS

(75) Inventor: Praveen K. Jain, Kingston (CA)

(73) Assignee: CHiL Semiconductor Inc., Tewksbury, MA (US)

( * ) Notice: Subject to any disclaimer, the term of this patent is extended or adjusted under 35 U.S.C. 154(b) by 480 days.

(21) Appl. No.: 11/644,280

(22) Filed: Dec. 22, 2006

(51) Int. Cl.
*G05F 1/59* (2006.01)

(52) U.S. Cl. .................. 323/272; 323/284; 323/289

(58) Field of Classification Search .......... 323/272, 323/282–290, 271, 268
See application file for complete search history.

(56) References Cited

U.S. PATENT DOCUMENTS

| | | | |
|---|---|---|---|
| 5,555,165 A | 9/1996 | Vinciarelli | 363/95 |
| 5,731,731 A | 3/1998 | Wilcox et al. | 327/403 |
| 5,946,210 A | 8/1999 | Montminy et al. | 700/97 |
| 6,188,209 B1 | 2/2001 | Poon et al. | 323/255 |
| 6,225,795 B1 | 5/2001 | Stratakos et al. | 323/284 |
| 6,285,175 B1 | 9/2001 | Massie | 323/290 |
| 6,307,356 B1 | 10/2001 | Dwelley | 323/282 |
| 6,351,108 B1 | 2/2002 | Burstein et al. | 323/283 |
| 6,498,467 B1 | 12/2002 | Stratakos | 323/284 |
| 6,545,450 B1 | 4/2003 | Ledenev et al. | 323/272 |
| 6,593,724 B1 | 7/2003 | Chen | 323/283 |
| 6,674,274 B2 * | 1/2004 | Hobrecht et al. | 323/285 |
| 6,696,823 B2 | 2/2004 | Ledenev et al. | 323/272 |
| 6,696,825 B2 | 2/2004 | Harris et al. | 323/282 |
| 6,696,882 B1 | 2/2004 | Markowski et al. | 327/531 |
| 6,703,814 B2 | 3/2004 | Pohlman et al. | 323/272 |
| 6,791,302 B2 | 9/2004 | Tang et al. | 323/272 |
| 6,803,752 B1 | 10/2004 | Chen | 323/282 |
| 6,809,504 B2 | 10/2004 | Tang et al. | 323/274 |
| 6,819,537 B2 | 11/2004 | Pohlman et al. | 361/64 |
| 6,828,765 B1 | 12/2004 | Schultz et al. | 323/284 |
| 6,897,715 B2 | 5/2005 | Barber, Jr. et al. | 327/541 |
| 6,909,265 B2 | 6/2005 | Tang | 323/274 |
| 6,943,535 B1 | 9/2005 | Schiff | 323/246 |
| 6,965,502 B2 | 11/2005 | Duffy et al. | 361/18 |
| 6,975,494 B2 | 12/2005 | Tang et al. | 361/64 |
| 2007/0273350 A1 * | 11/2007 | Yamamoto | 323/284 |

FOREIGN PATENT DOCUMENTS

WO  WO 2005109616 A1 * 11/2005

OTHER PUBLICATIONS

Formenti, J. & Martinez, R. (2004). Design Trade-offs for Switch-mode Battery Chargers. Texas Instruments, Inc. Workbook. Retrieved Feb. 5, 2009, from TI Web site: http://focus.ti.com/lit/ml/slyp089/slyp089.pdf.*
Lenk, R. (2005). "Practical Design of Power Supplies". pp. 50-52. Hoboken, NJ: John Wiley & Sons, Inc.*

* cited by examiner

*Primary Examiner*—Jeffrey L Sterrett
*Assistant Examiner*—Fred E Finch, III
(74) *Attorney, Agent, or Firm*—Chapin IP Law, LLC; Barry W. Chapin, Esq.

(57) ABSTRACT

A power supply system includes a first driver circuit to control a corresponding switching of a first switch device and a second switch device in the power supply system via different drive circuits. To reduce losses and thus improve efficiency of the power supply system, a first driver circuit can be configured to initiate a faster rate of transitioning the first switch device between ON and OFF states than a second driver initiates transitioning of the second switch device between ON and OFF states. To reduce the effects of introducing unwanted ripple voltage on an output signal used to drive a dynamic load, a controller in the power supply system can be configured to initiate shedding or adding of multiple voltage converter phases at the same time when load requirements cross a threshold value.

26 Claims, 10 Drawing Sheets

POWER SUPPLY CIRCUIT AND SWITCH DRIVERS

BACKGROUND

A voltage regulator module (e.g., a VRM) can be used to regulate a DC voltage supplied to a load, such as microprocessor. A VRM can include a power converter, such as a DC-DC converter, and may include other components such as a controller for controlling operation of the power converter.

An example of a DC-DC converter is a synchronous buck converter, which has minimal components, and therefore is widely used in VRM applications. In an example application, the input voltage to the buck converter is typically $12V_{DC}$. An output voltage produced by the VRM may be $5.0V_{DC}$, 3.3 $V_{DC}$, or lower.

Multiphase interleaved VRM topologies include two or more power converters operated in parallel with each other to convert power and apply it to a corresponding load. In each of the power converters (or each power converter phase), the filter inductor can be smaller than that of a single phase power converter in order to achieve a faster dynamic response. The large output voltage ripple in each phase due to the small inductance can be cancelled by the ripple of other phases. Use of more phases in parallel reduces the ripple voltage. Implementation of a multiphase voltage converter topology (as compared to a single voltage converter phase topology) can therefore enhance the output current capability of a power supply system.

A typical configuration of a VRM such as a so-called synchronous buck converter includes an inductor, a high side switch, and a low side switch. A controller associated with the buck converter repeatedly pulses the high side switch ON to convey power from a power source through the inductor to a dynamic load. The controller repeatedly pulses the low side switch ON to provide a low impedance path from a node of the inductor to ground in order to control an output of the buck converter. Thus, the energy stored in the inductor increases during a time when the high side switch is ON and decreases during a time when the low side switch is ON. During switching operation, the inductor transfers energy from the input to the output of the converter.

SUMMARY

Conventional voltage converter circuits as discussed above suffer from a number of deficiencies. For example, conventional synchronous buck converters are typically internally dissipate a portion of energy received from a respective power source in lieu of conveying all of the energy received from a respective power source to a corresponding load. This wasted energy precipitates out of the buck converter circuit as unwanted heat, which (if too high) can increase the likelihood of damage to the buck converter or other nearby electronic components. Losses (e.g., dissipation of unwanted heat) associated with the buck converter increase an amount of power that must be provided to the input of the buck converter. That is, inefficiencies in the buck converter can require that the power supply be oversized to account for losses in the buck converter and increases the cost of energy.

Techniques discussed herein deviate with respect to conventional applications such as those discussed above as well as other techniques known in the prior art. For example, certain embodiments herein are directed to improving the efficiency of switching power supply circuits.

More specifically, a power supply system according to embodiments herein includes a first driver circuit to control a corresponding switching of a first switch device (e.g., a low side switch device) in the power supply system and a second driver circuit to control a corresponding switching of a second switch device (e.g., a high side switch device) in the power supply system. To reduce losses and thus improve efficiency of the power supply system, the first driver circuit can be configured to initiate a faster rate of transitioning the first switch device between ON and OFF states than the second driver initiates transitioning of the second switch device between ON and OFF states. In other words, the power supply system can include a set of asymmetrical drivers (e.g., drivers having different associated current drive capability) that have an ability to turn switches ON or OFF at different rates. In the context of a buck converter power supply application in which the first switch device is a low side field effect transistor and the second switch device is a high side field effect transistor, the higher switching speed of the low side switch reduces an amount of losses associated with a respective inherent diode in the field effect transistor. Accordingly, a power supply system having asymmetrical current drive capability to control high and low side switches according to embodiments herein is more efficient than conventional methods having symmetrical current drive capability.

According to another embodiment herein, a power supply system can include a first voltage converter phase as well as multiple additional voltage converter phases. A controller in the power supply system can be configured to initiate activation of the first voltage converter phase and the multiple voltage converter phases in parallel to convey power from one or more power sources (e.g., a power rail of 12 VDC) to a dynamic load (e.g., a microprocessor device) when the dynamic load is above a threshold value. In response to detecting that the dynamic load changes (e.g., crosses the threshold value) and requires less power or current at a substantially constant current, the controller can initiate deactivation of the multiple voltage converter phases from conveying power from the one or more power sources to the dynamic load when the dynamic load is below the threshold value. Conversely, if a controller detects that the load increases above the threshold value, the controller can initiate adding multiple voltage converter phases in parallel with the first voltage converter phase to supplement an amount of power supplied to the dynamic load. Accordingly, one embodiment herein includes shedding or adding of multiple phases at the same time during a change in dynamic load. This embodiment contrasts with conventional power supply systems that shed or add phases one at a time for each successive threshold value.

As discussed above, techniques herein are well suited for use in switching power supply circuitry. However, it should be noted that embodiments herein are not limited to use in such applications and that the techniques discussed herein are well suited for other applications as well.

Note also that each of the different features, techniques, configurations, etc. discussed herein can be executed independently or in combination with any or all other features also described herein. Accordingly, the present invention can be embodied, viewed, and claimed in many different ways.

This summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to an example embodiment as described herein, a power supply system includes a first driver circuit to control a corresponding switching of a first switch device and a second switch device in the power supply system via different drive circuits. To reduce losses and thus improve efficiency of the power supply system, a first driver circuit can be configured to initiate a faster rate of transitioning the first switch device between ON and OFF states than a second driver initiates transitioning of the second switch device between ON and OFF states. The asymmetrical method of driving the first and second switch devices improves the efficiency of the power supply. To further improve the efficiency of the power supply that is providing power to a dynamic load, a controller in the power supply system can be configured to initiate shedding or adding of multiple voltage converter phases at the same time when load requirements cross a threshold value. This latter technique can be implemented separately from the asymmetrical current driver technique.

Figure 1:
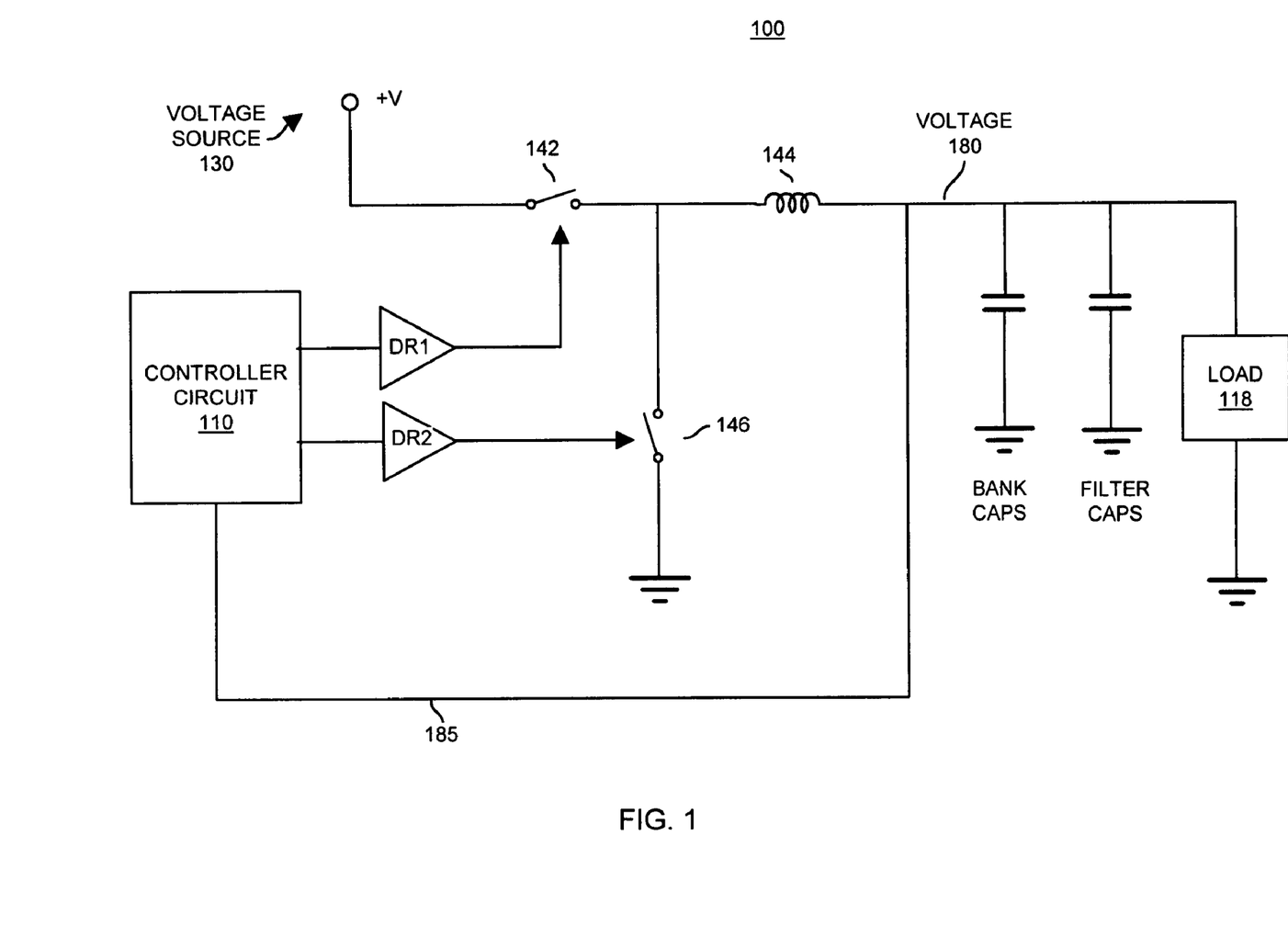
FIG. 1 is an example diagram of a power supply system according to embodiments herein.

FIG. 1 is a diagram of an example power supply system 100 according to embodiments herein. As shown, power supply system 100 includes a voltage source 130 (e.g., +12 VDC), a controller 110, drive circuit DR1 and drive circuit DR2, high side switch device 142, low side switch device 146, element 144 (e.g., an energy storage device such as an inductor, filter, etc.), and dynamic load 118.

A combination of the components in power supply system 100 (e.g., a single phase synchronous buck converter) comprises a switching power supply system that produces a substantially constant voltage 180 for driving dynamic load 118. Controller circuit 110 originates logic signals to initiate opening and closing of switches 142 and 146 such that voltage 180 is maintained within a specified range such as 1.5+/−0.05 VDC.

In one embodiment, controller circuit 110 utilizes feedback signal (e.g., the voltage provided to dynamic load 118) on which to open and close high side switch device 142 and low side switch device 146.

In contradistinction to conventional power supply systems, the power supply system 100 according to embodiments herein includes asymmetrical switch drive capability. For example, drive circuit DR1 can be configured to drive (e.g., source and/or sink) high side switch device 142 with one ampere of current. Drive circuit DR2 can be configured to drive (e.g., source and/or sink) dynamic load 118 with three amperes of current. The apportionment of current for each drive can vary depending on the application. Based on the asymmetrical drive capability, the drive circuit DR2 can more quickly turn ON low side switch device 146 from an OFF state than drive circuit DR1 can turn ON the high side switch device 142 from an OFF state. In a similar vein, the drive circuit DR2 can more quickly turn OFF low side switch device 146 from an ON state than drive circuit DR1 can turn OFF the high side switch device 142 from an ON state.

One purpose for implementing an asymmetrical drive circuit is to increase power efficiency associated with the power supply system 100. For instance, implementing a power supply system having an asymmetrical switch drive capability reduces losses in the power supply system 100 and thus improves its efficiency.

Figure 2:
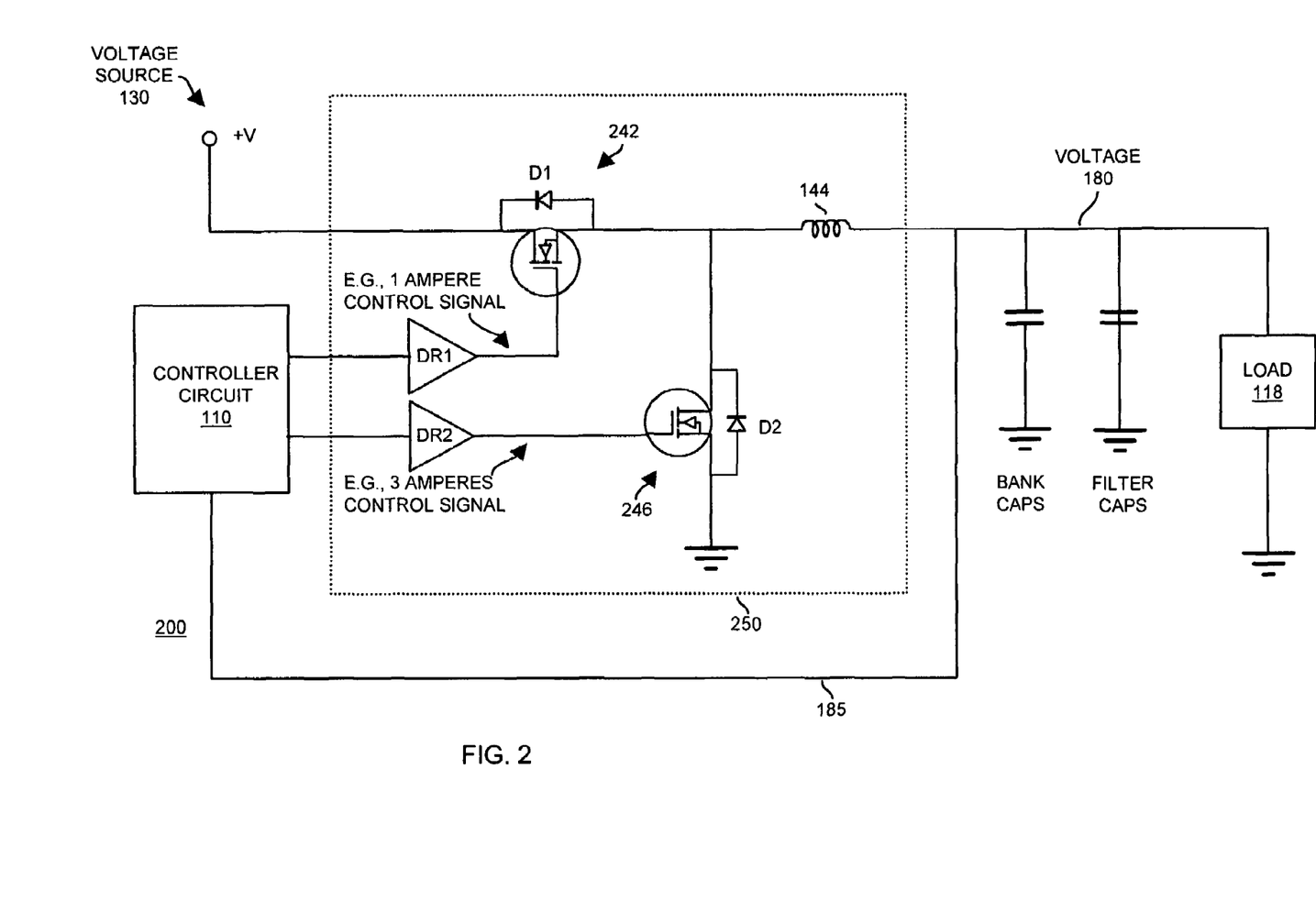
FIG. 2 is an example diagram illustrating a power supply according to embodiments herein

FIG. 2 is a diagram illustrating a power supply system 200 according to embodiments herein. As shown, power supply system 200 is similar to power supply system 100 shown in FIG. 1. However, the switch devices 142 and 146 have been replaced with field effect transistors 242 and 246 as illustrated in FIG. 2.

As previously discussed, to reduce losses and thus improve efficiency of the power supply system 200, the driver circuit DR2 can be configured to initiate a faster rate of transitioning the first switch device between ON and OFF states than the driver circuit DR1 initiates transitioning of the second switch device between ON and OFF states. In other words, the power supply system 200 can include a set of asymmetrical drivers (e.g., drivers having different associated current drive capability) that have an ability to turn switches ON or OFF at different rates.

In the embodiment shown, one parameter to control for more quickly turning ON and OFF the switch devices is an amount of current produced by the drive circuits DR1 and DR2. In addition to current, other parameters (e.g., voltage levels, etc.) associated with drive circuits (and/or related components) can be adjusted to provide asymmetrical switch drive capability.

In one embodiment, the drive circuits DR1 and DR2 can have a limited number of components such as transistors to sink and/or source current. One embodiment herein involves apportioning more of such resources to initiate faster transitioning of field effect transistor 246 between ON and OFF states (e.g., between an ON state and a subsequent OFF state or between an OFF state and a subsequent ON state) than transitioning field effect transistor 242 between ON and OFF states (e.g., between an ON state and a subsequent OFF state or between an OFF state and a subsequent ON state).

As shown, in the context of a buck converter power supply application in which the low side switch device (e.g., field effect transistor 246) and the high side switch device (e.g., field effect transistor 242), the higher (transition) switching speed of the low side switch reduces an amount of losses associated with a respective inherent diode D2 in the field effect transistor 246.

For example, when voltage 180 is below a threshold value, controller circuit 110 initiates turning field effect transistor 242 to a respective ON state. When ON, inductor 144 is charged with energy from voltage source 130. The energy is conveyed to dynamic load 118 in the form of current, which increases voltage 180. Based on feedback 185, the controller circuit 110 detects when the voltage increases to an acceptable level again. When so reached, the controller circuit 110 shuts OFF field effect transistor 242 and turns ON field effect transistor 246. However, note that controller circuit 110 does not turn ON field effect transistor 246 until field effect transistor 242 is completely turned to an OFF state. Thus, there is a duration of time after turning field effect transistor 242 OFF (before turning field effect transistor 2460N) that current flows from ground, through diode D2 of field effect transistor 246 and inductor 144 to voltage dynamic load 118. There is a voltage drop across the diode D2 representing a loss of power during the instant that neither field effect transistor 242 and field effect transistor 246 are in the ON state.

As described herein, initiating a faster transitioning of field effect transistor 246 reduces an amount of losses in the diode D2. In other words, field effect transistor 246 can be more quickly turned to a respective ON state by more quickly charging its respective gate (via driving it with higher current) to an appropriate voltage. The gate of field effect transistor 242 is driven with lower current on switchover and therefore changes state more slowly. The slower turn-on of the high side transistor 242 results in slower transfer of current from the diode D2. This results in lower diode recovery losses in the diode D2. Accordingly, a power supply system 200 having asymmetrical current drive capability to control high and low side switches according to embodiments herein is more efficient than conventional methods having symmetrical current drive capability such as a power supply system in which both drive circuits are balanced to drive an equal amount of current to each device.

Figure 3:
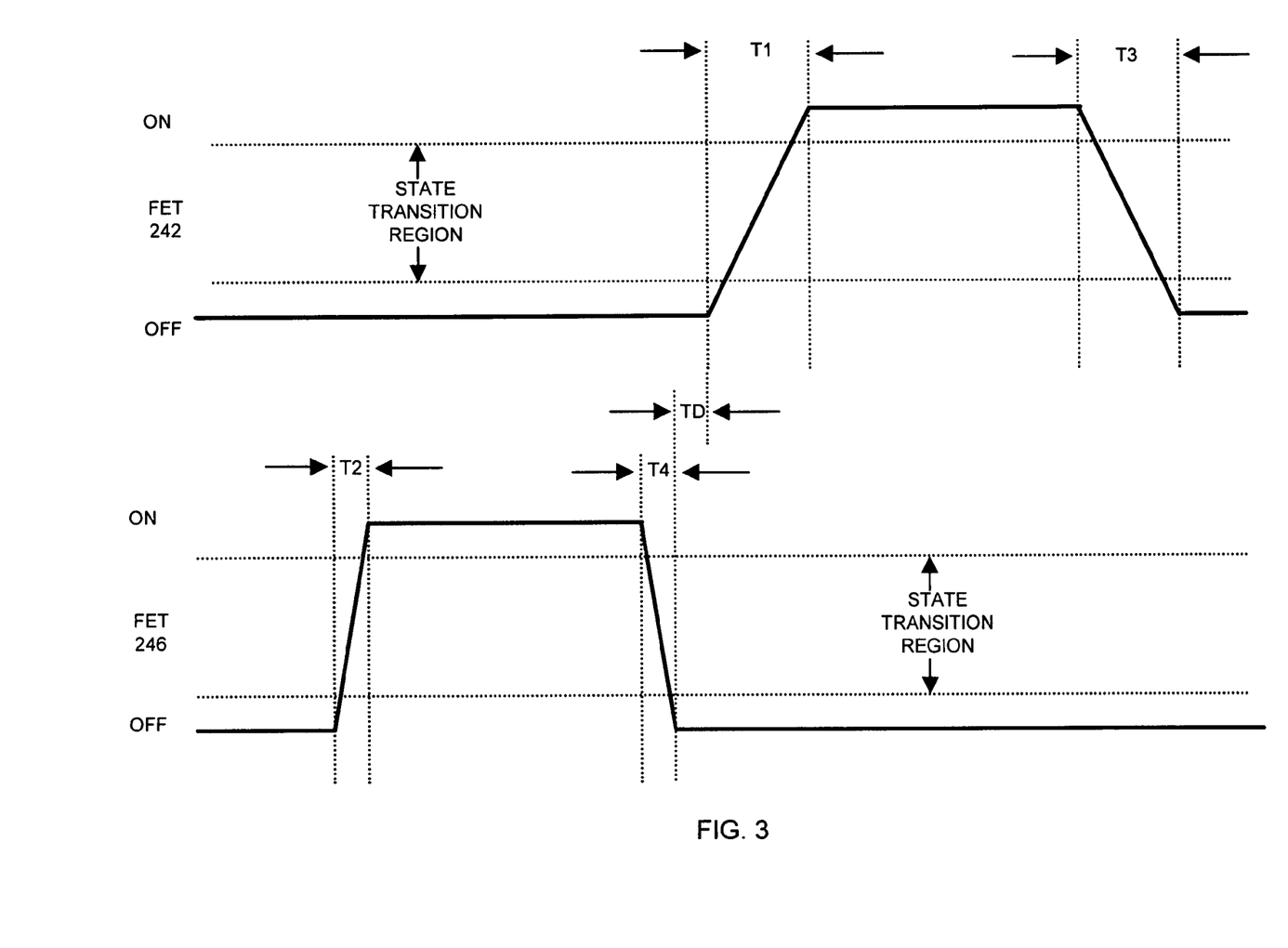
FIG. 3 is an example diagram of timing information according to embodiments herein.

FIG. 3 is a diagram illustrating state transition times associated with field effect transistor 242 and field effect transistor 246 shown in FIG. 2. Assume that each of field effect transistor 242 and field effect transistor 246 have approximately the same gate capacitance that must be charged to turn ON a respective switch so that the field effect transistor conducts current. As shown, because the gate of field effect transistor 246 is driven (e.g., sourced and/or sinked) with more current than field effect transistor 242, the respective gate of field effect transistor 246 more quickly charges and turns field effect transistor 246 to an ON state than field effect transistor 242 turns to an ON when so driven. In the context of the present example, the amount of time to turn ON field effect transistor 246 is equal to T2. The time to turn ON field effect transistor 242 to an ON state is T1. As illustrated, time T2 is noticeably smaller than time T1. Thus, field effect transistor 246 more quickly transitions to an ON state than field effect transistor 242.

Conversely, because the gate of field effect transistor 246 is driven (e.g., sourced or sinked) with more current than field effect transistor 242, the respective gate of field effect transistor 246 is more quickly depleted of charge and turns field effect transistor 246 to an OFF state faster than field effect transistor 242 is turned to an OFF state. In the context of the present example, the amount of time to turn OFF field effect transistor 246 is equal to T4. The time to turn OFF field effect transistor 242 to an OFF state is T3. As illustrated, time T4 is noticeably smaller than time T3. Thus, field effect transistor 246 more quickly transitions to an OFF state than field effect transistor 242.

Figure 4:
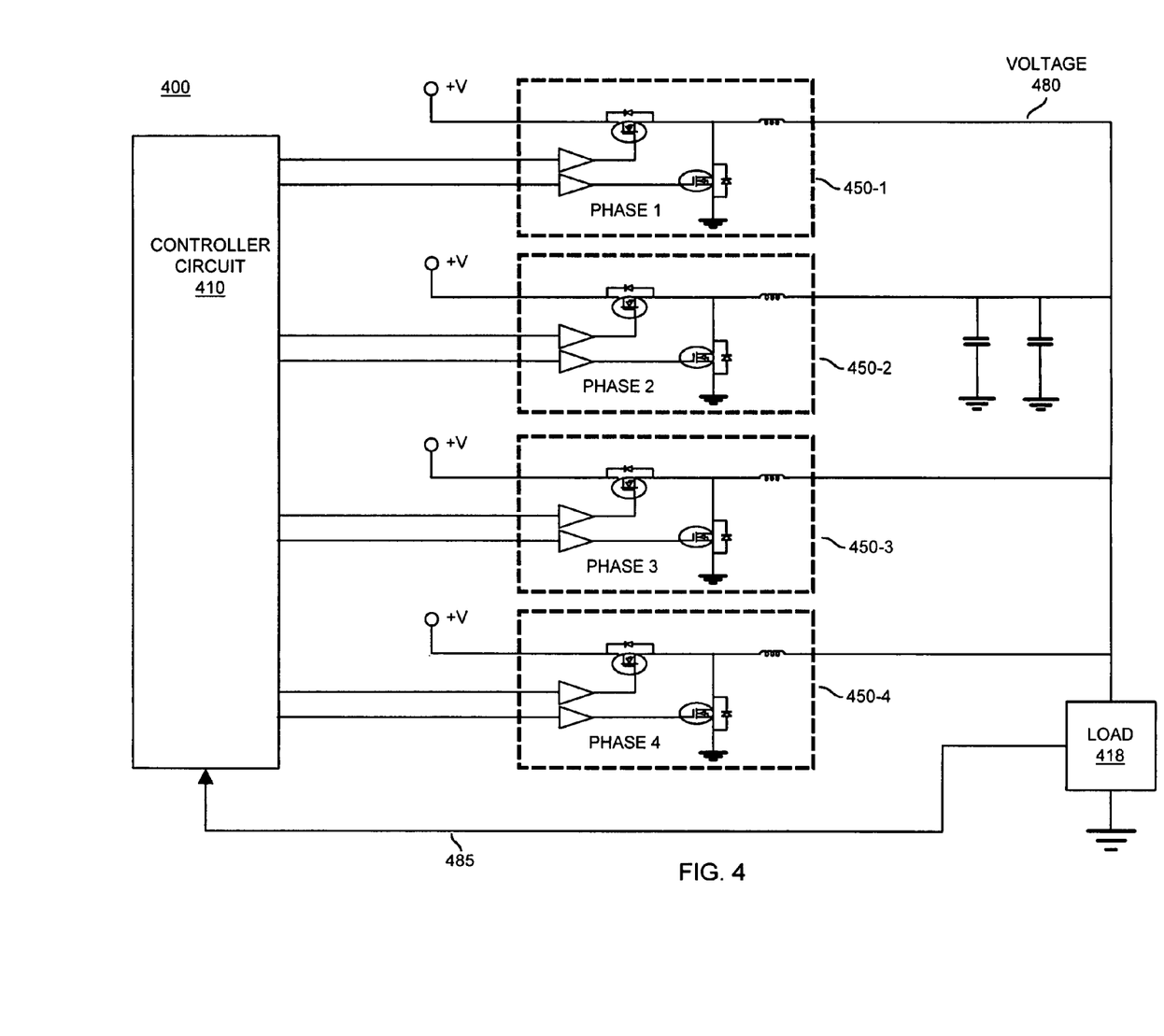
FIG. 4 is an example of a multiphase power supply system according to embodiments herein.

FIG. 4 is a diagram of a power supply system 400 including multiple phases according to embodiments herein. As shown, one or more of the voltage converter phases can operate as discussed above with respect to FIGS. 1 and 2. For example, each of one or more voltage converter phases 450 can include either asymmetrical or symmetrical drive circuits. In the context of the present example, power supply system 400 includes four voltage converter phases 450 such as voltage converter phase 450-1, voltage converter phase 450-2, voltage converter phase 450-3, and voltage converter phase 450-4. The phases can be configured ninety degrees apart from each other in order to provide a substantial amount of power at a constant voltage 480 with minimal ripple voltage.

Note that power supply system 400 can be configured to include feedback 485 from dynamic load 418 such as a microprocessor device, whose power requirements can dramatically change from one instant in time to the next. Controller circuit 410 can utilize this information to control either a single phase or all the phases simultaneously in order to provide dynamic load 418 a constant voltage 480. In other words, a single voltage converter phase 450-1 may not be able to provide enough current at the given voltage 480 to power dynamic load 480. In such a case, the controller circuit 410 can initiate turning ON of all remaining voltage converter phases 450 in order to convert enough power for consumption by dynamic load 418. Conversely, the controller circuit 418 can initiate simultaneous shedding (e.g., turning OFF) of voltage converter phases 450 when the dynamic load 418 requires less power.

In yet another embodiment, note that the power supply system 400 can be configured to operate all of the voltage converter phases without shedding or adding of phases when the dynamic load 418 changes.

Figure 5:
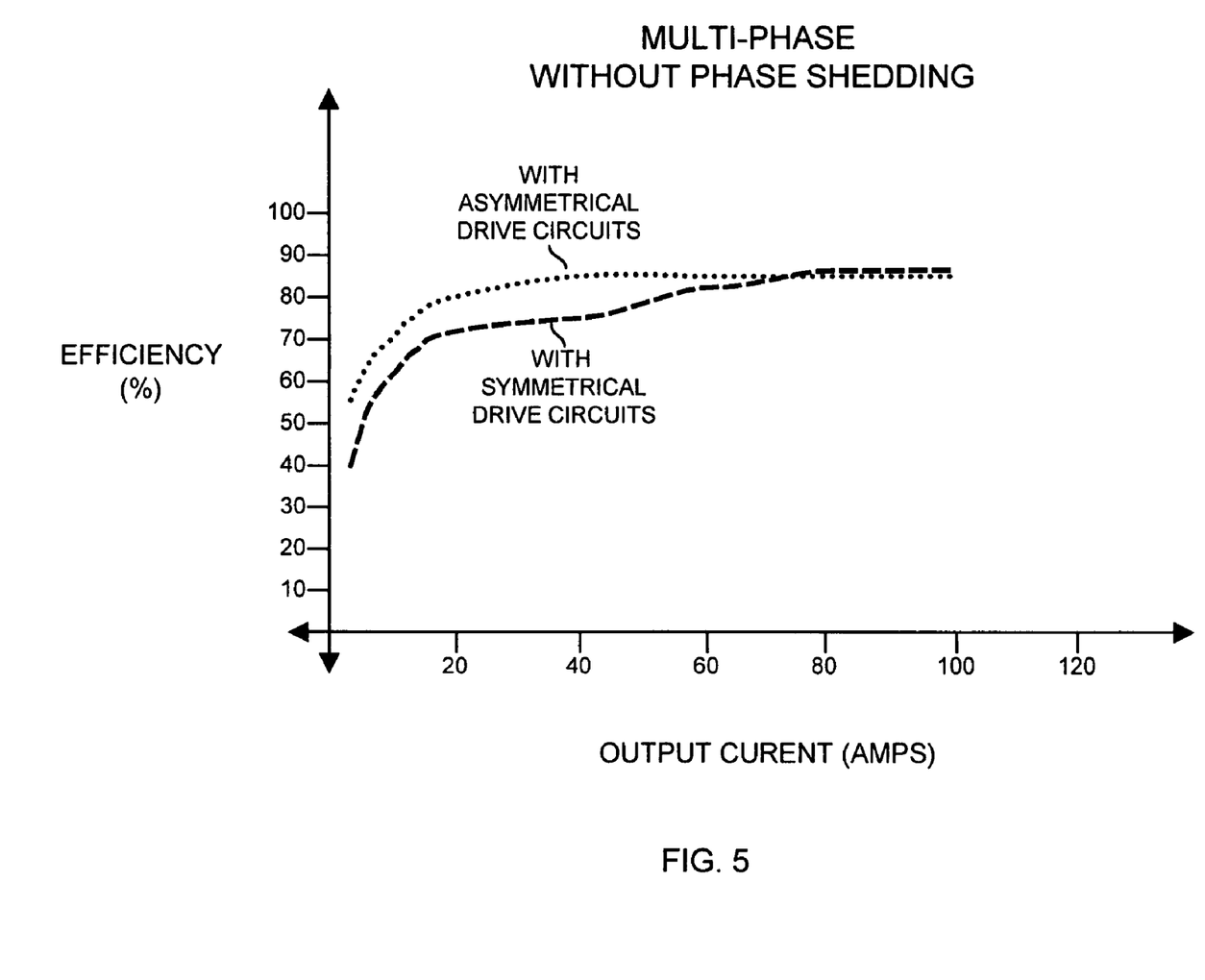
FIG. 5 is an example diagram illustrating a benefit of utilizing an asymmetrical drive circuit in a multiphase power supply system without phase shedding according to embodiments herein.

For this latter example, FIG. 5 illustrates an experimentally measured efficiency graph associated with power supply system in which there is no phase shedding. In such an embodiment, the asymmetrical drive circuits as discussed above improve conversion efficiency because less energy is dissipated by the components in the power supply system 400 during operation than when implementing (conventional) symmetrical drive circuits.

Figure 6:
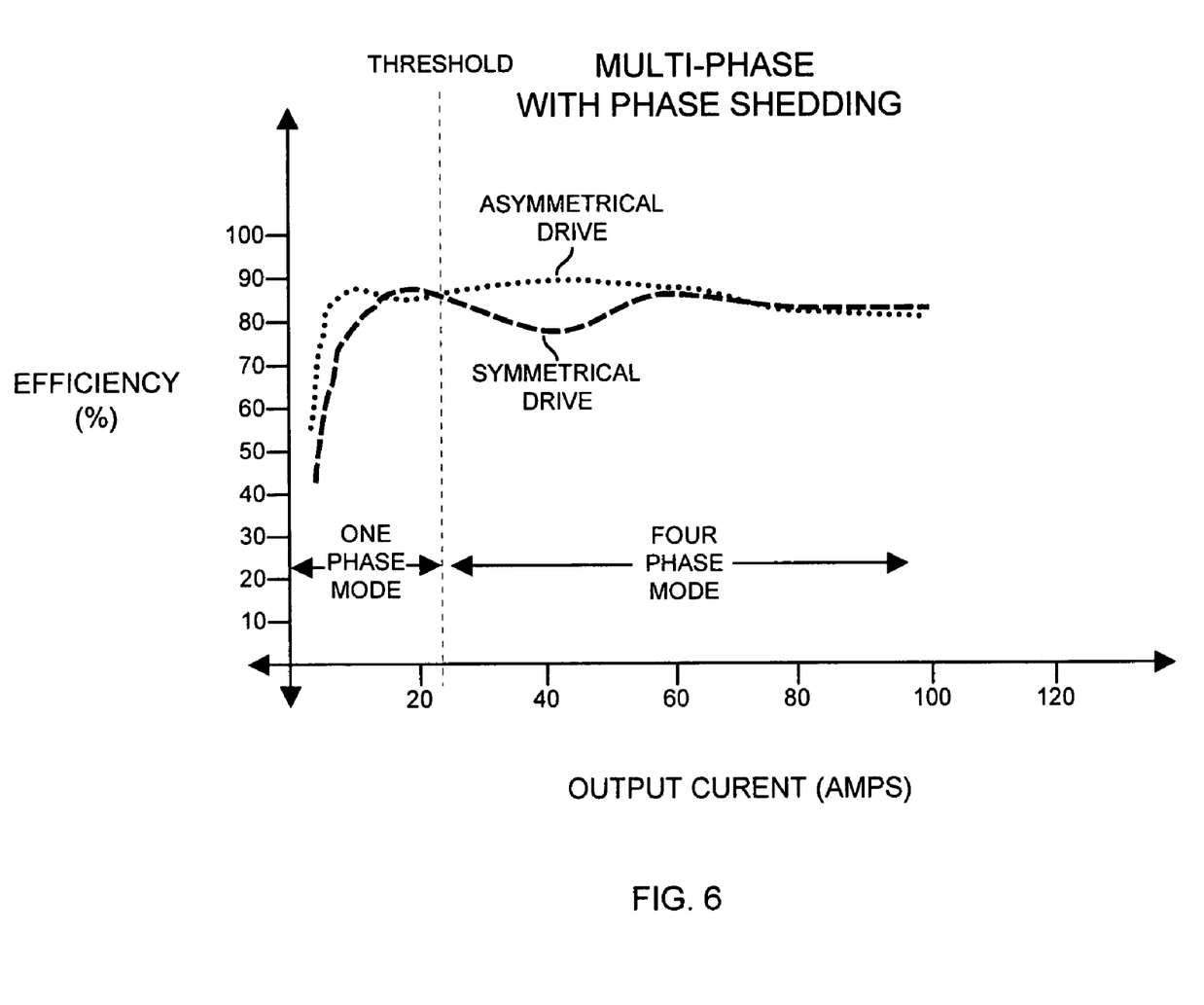
FIG. 6 is an example diagram illustrating a benefit of utilizing an asymmetrical drive circuit in a multiphase power supply system with phase shedding according to embodiments herein.

For the former example in FIG. 4 in which the controller circuit 410 does perform phase shedding, FIG. 6 illustrates a corresponding experimentally measured efficiency graph associated with power supply system 400. As previously discussed, controller circuit 410 implements voltage converter phase shedding (or adding of phases) depending on power requirements associated with the dynamic load 418. Further, the asymmetrical drive circuits improve conversion efficiency because less energy is dissipated by the components in the power supply system 400 during operation than when implementing (conventional) symmetrical drive circuits as previously discussed. Note that the efficiency using only a single phase between zero and approximately 25 amperes is considerably higher than implementing all four phases at the same time during this respective low power mode of dynamic load 418. When the dynamic load 418 requires more current above a respective threshold value such as approximately 20-25 amperes, the controller circuit 418 activates multiple additional phases (e.g., three extra phases in this example) to convert power for use by dynamic load 418.

As previously discussed, the controller circuit 418 can receive a signal (e.g., feedback signal 485 as in FIG. 4) from the dynamic load 418 (e.g., microprocessor) that additional current will be needed either immediately or in the near future so that controller circuit 410 can react to changes in the dynamic load 418. The feedback signal also can indicate when power requirements fall below a respective threshold so that controller circuit 410 can react appropriately and shut down multiple voltage converter phases.

In other embodiments, the controller circuit 410 can monitor internal signals produced by the controller circuit 410 to identify whether or not add or shed phases. For example, if the controller circuit 410 detects that a single activated phase has reached a maximum duty cycle to provide power to dynamic load 418, the controller circuit 410 can initiate adding of phases. In a similar vein, the controller circuit 410 can detect when multiple voltage converter phases need not be activated for conversion purposes and shed multiple phases simultaneously.

In yet other embodiments, in addition to or in lieu of the above techniques, the controller circuit 410 can monitor a state of voltage 480 to identify when to add or shed voltage converter phases 450 to produce voltage 480.

Accordingly, a power supply system 400 can include a first voltage converter phase as well as multiple additional voltage converter phases 450. A controller in the power supply system can be configured to initiate activation of the first voltage converter phase and the multiple voltage converter phases in parallel to convey power from at least one power source (e.g., a power rail of 12 VDC) to a dynamic load (e.g., a microprocessor device) when the dynamic load is above a threshold value. In response to detecting that the dynamic load changes and requires less power, the controller initiates deactivation of the multiple voltage converter phases from conveying power from the at least one power source to the dynamic load when the dynamic load is below the threshold value.

Conversely, if a controller detects that the load increases above a threshold value, the controller can initiate simultaneously adding multiple voltage converter phases in parallel with the first voltage converter phase to supplement an amount of power supplied to the dynamic load. Accordingly, one embodiment herein includes shedding or adding of multiple phases at the same time during a change in dynamic load. This embodiment contrasts with conventional power supply systems that shed or add phases one at a time for each successive threshold value. Adding all the multiple voltage converter phases at the same time according to embodiments herein reduces ripple.

Figure 7:
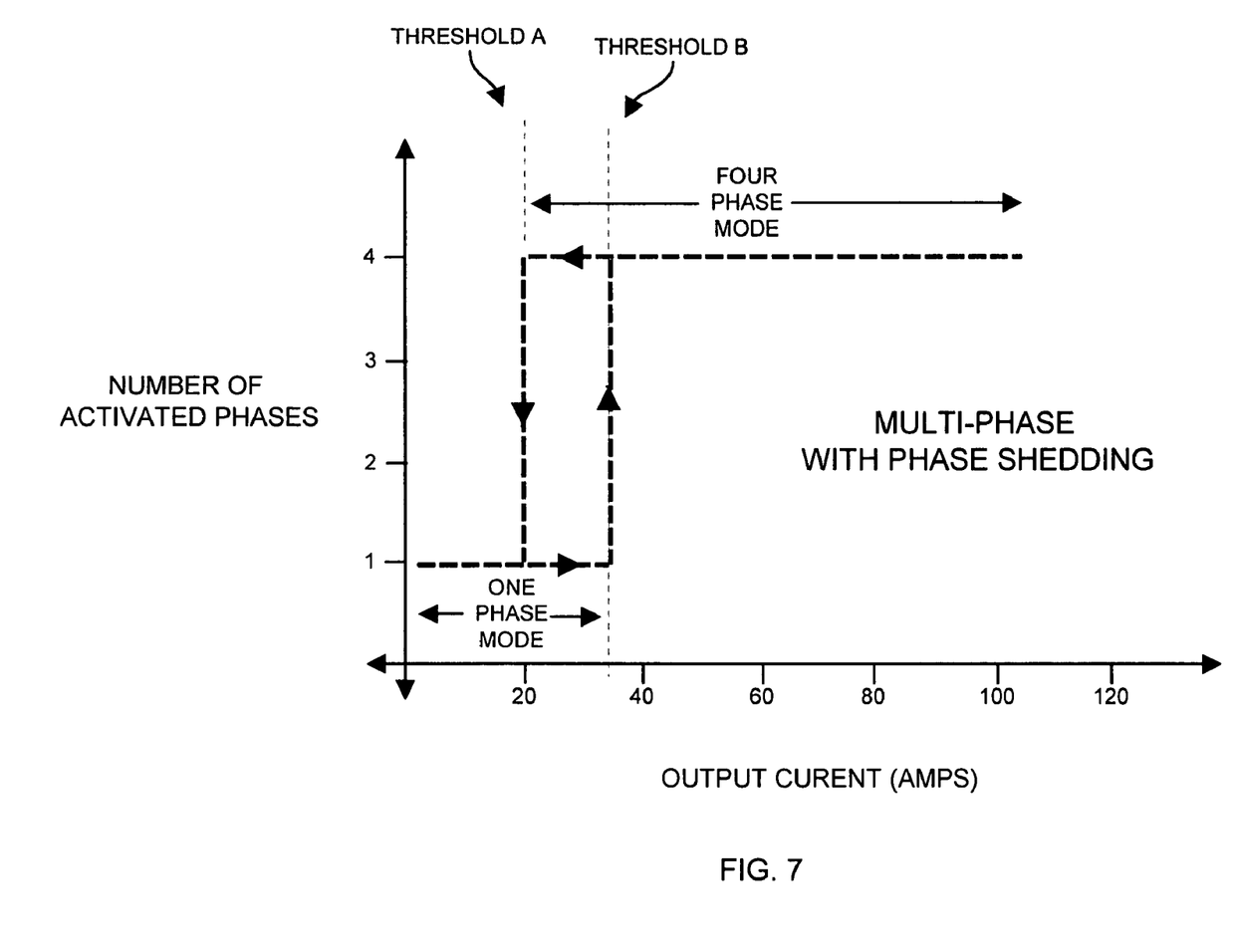
FIG. 7 is an example diagram illustrating shedding of multiple voltage converter phases according to embodiments herein.

FIG. 7 is a diagram illustrating a method for adding or shedding voltage converter phases according to embodiments herein. For example, when a device such as dynamic load 418 is first powered, the controller circuit 410 can initiate activation of a single phase to handle the power requirements of dynamic load 418. When the current requirements exceed a threshold value such as threshold B, the controller circuit 410 according to embodiments herein can initiate adding of multiple phases for the increased consumption by dynamic load 418. After initiating multiple phases, the controller circuit 410 can shed voltage converter phases when the current consumption requirements associated with dynamic load 418 falls below threshold value B. As previously discussed, one embodiment herein includes only a single threshold value (e.g., 25 amperes) above which the controller circuit 410 initiates activation of all voltage converter phases 450 to produce a constant output voltage 480 and below which the controller circuit 410 initiates activation of only one of the four voltage converter phases 450 (e.g., voltage converter phase 450-1) to produce the voltage 480.

Figure 8:
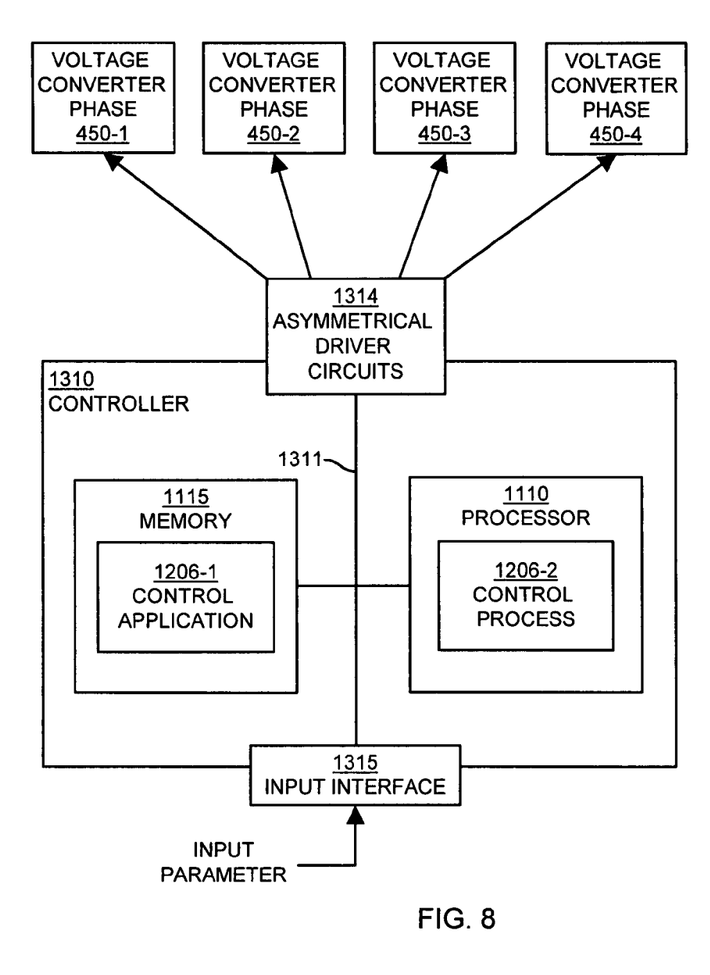
FIG. 8 is an example diagram illustrating an architecture for producing control signals according to embodiments herein.

FIG. 8 is a block diagram of an example architecture of a respective controller system 1310 for implementing controller circuit 1206 and corresponding drive circuits according to embodiments herein. Controller system 1310 can include a DSP (Digital Signal Processor), FPGA (Field Programmable Gate Array), micro-controller, etc. to carry out the techniques as discussed above and further below.

As shown, controller system 1310 of the present example includes an interconnect 1311 that couples a memory system 1115, a processor 1110, asymmetrical drive circuits 1314, and an input interface 1315. Input interface 1315 can include an analog-to-digital converter for monitoring voltage 1220, a digital interface for receiving communications from dynamic load 418 such as current or projected load information provided by a respective microprocessor, etc.

As shown, memory system 1115 can be encoded with a control application 1206-1 (e.g., control laws or rules) that enables processor system 1310 to support generation of appropriate control signals to regulate voltage 1220 via one or more voltage converter phases 450 and corresponding asymmetrical drive circuits 1314 as discussed above and as discussed further below. Accordingly, control application 1206-1 can be embodied as software code such as data and/or logic instructions (e.g., code stored in the memory or on another computer readable medium such as a disk) that supports processing functionality according to different embodiments described herein.

During operation according to one embodiment, processor 1110 accesses memory system 1115 via the use of interconnect 1311 in order to launch, run, execute, interpret or otherwise perform the logic instructions of the control application 1206-1. Execution of the control application 1206-1 produces processing functionality in control process 1206-2. In other words, the control process 1206-2 represents one or more portions of the control application 1206-1 performing within or upon the processor device 1310.

It should be noted that, in addition to the control process 1206-2 that carries out method operations as discussed herein, other embodiments herein include the control application 1206-1 itself (i.e., the un-executed or non-performing logic instructions and/or data for producing control signals to control each of multiple voltage converter phases 450). The control application 1206-1 may be stored on a computer readable medium (e.g., a repository) such as a floppy disk, hard disk or in an optical medium. According to other embodiments, the control application 1206-1 can also be stored in a memory type system such as in firmware, read only memory (ROM), or, as in this example, as executable code within the memory system 1115 (e.g., within Random Access Memory or RAM).

Functionality supported by controller circuit 1206 will now be discussed via flowcharts 800 and 900 in respective FIGS. 9 and 10. For purposes of the following discussion, the controller circuit 410 and/or asymmetrical drive circuits generally performs steps in the flowchart. Note that there will be some overlap with respect to concepts discussed above. Also, note that the steps in the below flowcharts need not always be executed in the order shown.

Figure 9:
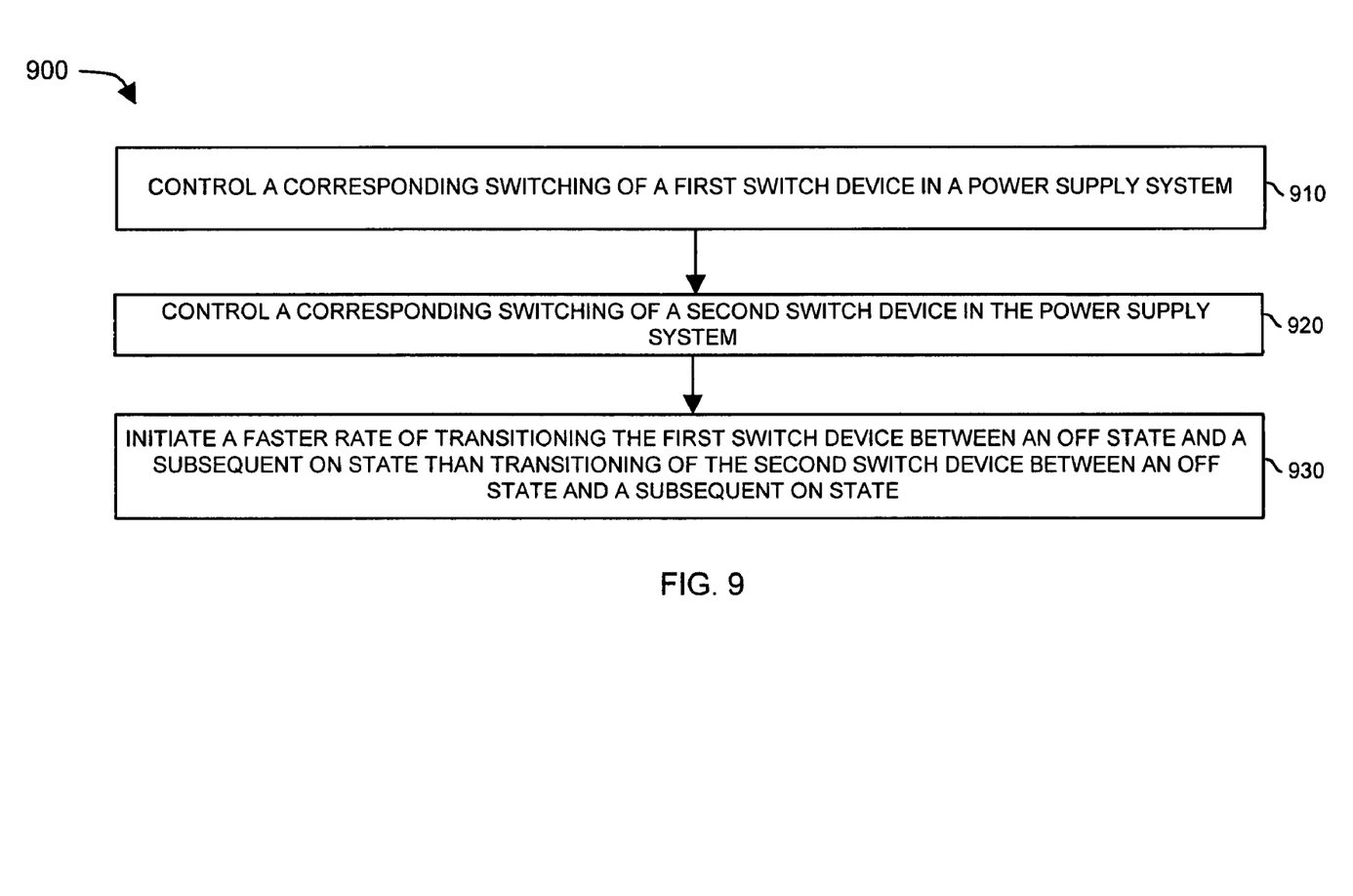
FIG. 9 is a flowchart illustrating an example of a method for implementing an asymmetrical drive circuitry according to embodiments herein.

FIG. 9 is a flowchart 900 illustrating a technique of supplying power based on use of a single voltage converter phase or multiple voltage converter phases according to embodiments herein.

In step 910, controller circuit 410 controls a corresponding switching of a first switch device 146 in a power supply system 100 via a respective drive circuit DR1.

In step 920, controller circuit 410 controls a corresponding switching of a second switch device in the power supply system via a respective drive circuit DR2.

In step 930, the controller circuit 410 operates drive circuits (e.g., drive circuits DR1 and DR2 as discussed above). Based on a respective configuration, drive circuits initiate a faster rate of transitioning the first switch device 146 between an off state and a subsequent on state than transitioning of the second switch device 142 between an off state and a subsequent on state.

Note that in the case of implementing multiple voltage converter phases 450, the controller circuit 410 provides controls signals to multi corresponding asymmetrical driver circuits for each phase that, in turn, drive respective high side and low side switch devices for a respective phase.

Figure 10:
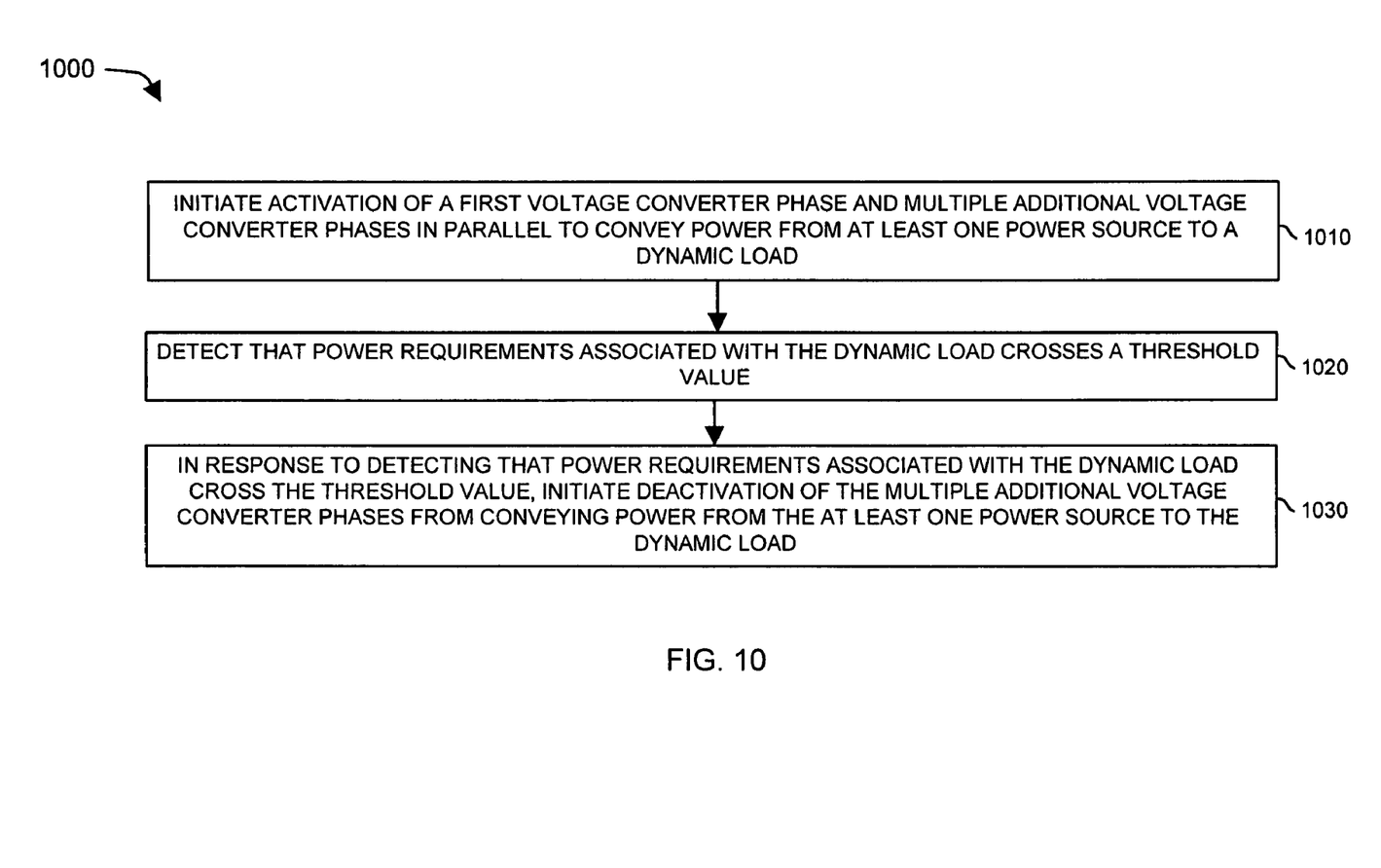
FIG. 10 is a flowchart illustrating an example of a method for implementing phase shedding according to embodiments herein.

FIG. 10 is a flowchart 1000 illustrating a technique of supplying power according to embodiments herein.

In step 1010, the controller circuit 110 initiates activation of a first voltage converter phase (e.g., voltage converter phase 450-1) and multiple additional voltage converter phases (e.g., voltage converter phase 450-2, voltage converter phase 450-3, and voltage converter phase 450-4) in parallel to convey power from a corresponding one or more power sources to a dynamic load 418.

In step 1020, the controller circuit 110 detects that power requirements associated with the dynamic load 418 crosses a threshold value.

In step 1010, in response to detecting that power requirements associated with the dynamic load cross the threshold value, the controller circuit 418 initiates simultaneous deactivation of the multiple additional voltage converter phases (e.g., voltage converter phase 450-2, 450-3, and 450-4) from conveying power from the one or more power source to the dynamic load 418.

As discussed above, the controller circuit 410 can also initiate simultaneous deactivation of multiple voltage converter phases (e.g., shed phases 450-2, 450-3, and 450-4) to continue producing a constant output voltage when the dynamic load requirements fall below a respective threshold value.

Note that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A power supply system comprising:
a first driver circuit to control a corresponding switching of a first switch device in the power supply system;
a second driver circuit to control a corresponding switching of a second switch device in the power supply system; and
the first driver circuit configured to initiate a faster rate of transitioning the first switch device between ON and OFF states than the second driver initiates transitioning of the second switch device between ON and OFF state;
wherein the first driver circuit produces an output current to drive the first switch device; and
wherein the second driver circuit produces an output current to drive the second switch device, the output current produced by the first driver circuit being substantially greater than the output current produced by the second driver circuit to initiate a faster rate of transitioning the first switch device between an OFF state and a subsequent ON state than the second driver initiates transitioning of the second switch device between an OFF state and a subsequent ON state.

2. A power supply system as in claim 1, wherein the first switch device is a first field effect transistor and the second switch device is a second field effect transistor; and
wherein the first driver circuit is configured to drive a respective gate of the first field effect transistor with the output current produced by the first driver circuit and the second driver circuit is configured to drive a respective gate of the second field effect transistor with the output current produced by the second driver circuit, the output current produced by the first driver circuit being substantially greater than the output current produced by the second driver circuit.

3. A power supply system as in claim 2, wherein the second field effect transistor is a high side switch device in the power supply system, the high side switch device coupling a voltage source to a node of an inductor when the high side switch device is in an ON state; and
wherein the first field effect transistor is a low side switch device in the power supply system, the low side switch device coupling a reference voltage to the node of the inductor when the low side switch device is in an ON state.

4. A power supply system as in claim 3, wherein the second field effect transistor is an N-type field effect transistor; and
wherein the first field effect transistor is an N-type field effect transistor.

5. A power supply system as in claim 4, wherein the low side switch device includes an inherent diode; and
wherein a slower rate of turning the high side switch device from an OFF state to an ON state with the first driver circuit results in a slower transfer of current through the inherent diode in the low side switch device, the slower transfer resulting in lower diode recovery losses in the inherent diode.

6. A power supply system as in claim 2, wherein the first driver circuit transitions the first field effect transistor from an ON state to a subsequent OFF state at least two times faster than the second driver circuit transitions the second field effect transistor from an ON state to a subsequent OFF state.

7. A power supply system as in claim 1, wherein the second switch device is configured to convey power from a power source to an inductor when the second switch device is in a respective ON state; and
wherein the first switch device is configured to apply a voltage reference to the inductor when the second switch device is in a respective ON state.

8. A power supply system as in claim 1 further comprising:
a signal generator configured to:
control the first driver circuit to turn ON the first switch device while the second driver circuit turns OFF the second switch device, and
control the first driver circuit to turn OFF the first switch device while the second driver circuit turns ON the second switch device.

9. A power supply system as in claim 8, wherein the signal generator is configured to:

control the second switch device to selectively convey power from a power source to a corresponding load; and
control the first switch device to selectively provide a reference voltage to ground.

10. A power supply system as in claim 1, wherein a combination of the first driver circuit, the first switch device, the second driver circuit, and the second switch device form a first voltage converter phase of multiple parallel voltage converter phases in the power supply system that each convey power from a power source to a respective load at a substantially constant voltage level.

11. A power supply system as in claim 10, wherein a second power converter phase of the multiple parallel voltage converter phases includes:
a third driver circuit to control a corresponding switching of a third switch device in the power supply system;
a fourth driver circuit to control a corresponding switching of a fourth switch device in the power supply system; and
the third driver circuit configured to initiate a faster rate of transitioning the third switch device between ON and OFF states than the fourth driver initiates transitioning of the fourth switch device between ON and OFF states.

12. A power supply system as in claim 10 further comprising:
a monitor circuit configured to:
detect an amount of power provided by the multiple parallel voltage converters to a respective load, at least a portion of the amount of current supplied by the first power converter phase; and
upon detecting that the amount of power provided by the multiple parallel converters falls below a threshold value, initiate deactivation of multiple voltage converter phases while the first voltage converter phase is configured to convey power to the respective load.

13. A power supply system as in claim 1, wherein the first driver circuit is configured to deliver more current to more quickly initiate a respective state transition associated with the first switch device than current delivered by the second driver circuit to control a respective state transition associated with the second switch device.

14. A power supply system as in claim 13, wherein the first switch device and the second switch device are field effect transistors and the first driver circuit and the second driver circuit deliver current to charge respective gates associated with the field effect transistors.

15. A power supply system as in claim 1, wherein the first switch device is a low side switch in the power supply system and the second switch device is a high side switch in the power supply system.

16. A power supply system comprising:
a first driver circuit to control a corresponding switching of a first switch device in the power supply system;
a second driver circuit to control a corresponding switching of a second switch device in the power supply system; and
the first driver circuit configured to initiate a faster rate of transitioning the first switch device between ON and OFF states than the second driver initiates transitioning of the second switch device between ON and OFF state;
wherein the first driver circuit is configured to initiate a substantially faster rate of transitioning the first switch device from an OFF state to an ON state than the second driver initiates transitioning of the second switch device from an OFF state to an ON state; and
wherein a slower transition rate of transitioning the second switch device from the OFF state to the ON state reduces an amount of power consumed by a respective inherent diode in the first switch device.

17. A power supply system comprising:
a first voltage converter phase;
multiple voltage converter phases in addition to the first voltage converter phase; and
a controller configured to:
initiate activation of the first voltage converter phase and the multiple voltage converter phases in parallel to convey power from at least one power source to a dynamic load when the dynamic load is above a threshold value, and
initiate deactivation of the multiple voltage converter phases from conveying power from the at least one power source to the dynamic load when the dynamic load is below the threshold value;
a first driver circuit to control a corresponding switching of a first switch device associated with the first voltage converter phase;
a second driver circuit to control a corresponding switching of a second switch device associated with the first voltage converter phase; and
the first driver circuit configured to initiate a substantially faster rate of transitioning the first switch device between an OFF state and a subsequent ON state than the second driver initiates transitioning of the second switch device between an OFF state and a subsequent ON state.

18. A power supply system as in claim 17, wherein the controller is configured to continue enabling the first voltage converter phase to convey power from the at least one power source to the dynamic load when the dynamic load is below the threshold value.

19. A power supply system as in claim 18, wherein each of the first voltage converter and multiple voltage converter phases, when activated, is configured to supply a constant voltage to the dynamic load.

20. A method comprising:
controlling a corresponding switching of a first switch device in a power supply system;
controlling a corresponding switching of a second switch device in the power supply system; and
when controlling the corresponding switching of the first switch device and the second switch device, initiating a substantially faster rate of transitioning the first switch device between an OFF state and a subsequent ON state than transitioning of the second switch device between an OFF state and a subsequent ON state.

21. A method as in claim 20 further comprising:
controlling the first switch device and the second switch device such that the first switch device and the second switch device are not both in an ON state at the same time.

22. A method as in claim 20 further comprising:
generating a constant voltage to a load based on controlling the first switch device and the second switch device.

23. A method as in claim 20, wherein controlling the corresponding switching of the second switch device results in conveying power from a power source to an inductor of a switching power supply when the second switch device is in a respective ON state; and
wherein controlling the corresponding switching of the first switch device results in providing a low impedance path between a node of the inductor and ground when the first switch device is in a respective ON state.

24. A method as in claim 20, wherein initiating the substantially faster rate of transitioning the first switch device reduces an amount of power consumed by a respective inherent diode in the first switch device.

25. A method as in claim 20, wherein initiating the faster rate of transitioning includes delivering more current to initiate a respective state transition associated with the first switch device than an amount of current that is delivered to control a respective state transition associated with the second switch device.

26. A method comprising:
   initiating activation of a first voltage converter phase and multiple additional voltage converter phases in parallel to convey power from at least one power source to a dynamic load; and
   in response to detecting that power requirements associated with the dynamic load crosses a threshold value, initiating deactivation of the multiple additional voltage converter phases from conveying power from the at least one power source to the dynamic load;
   wherein initiating activation of the first voltage converter phase includes:
      controlling a corresponding switching of a first switch device associated with the first voltage converter phase;
      controlling a corresponding switching of a second switch device associated with the first voltage converter phase; and
      when controlling the corresponding switching of the first switch device and the second switch device, initiating a faster rate of transitioning the first switch device between an OFF state and a subsequent ON state than transitioning of the second switch device between an OFF state and a subsequent ON state.

* * * * *